(12) United States Patent
Shi

(10) Patent No.: US 9,112,278 B2
(45) Date of Patent: Aug. 18, 2015

(54) RADAR DEVICE FOR BEHIND WINDSHIELD INSTALLATIONS

(71) Applicant: DELPHI TECHNOLOGIES, INC., Troy, MI (US)

(72) Inventor: Shawn Shi, Thousand Oaks, CA (US)

(73) Assignee: Delphi Technologies, Inc., Troy, MI (US)

( * ) Notice: Subject to any disclaimer, the term of this patent is extended or adjusted under 35 U.S.C. 154(b) by 265 days.

(21) Appl. No.: 13/904,300

(22) Filed: May 29, 2013

(65) Prior Publication Data
US 2014/0354462 A1 Dec. 4, 2014

(51) Int. Cl.
*G01S 7/02* (2006.01)
*G01S 13/02* (2006.01)
(Continued)

(52) U.S. Cl.
CPC .............. *H01Q 17/00* (2013.01); *G01S 13/424* (2013.01); *G01S 13/931* (2013.01); *H01Q 1/1271* (2013.01); *H01Q 1/3233* (2013.01); *H01Q 1/526* (2013.01); *H01Q 13/206* (2013.01);
(Continued)

(58) Field of Classification Search
CPC ......... H01Q 1/12; H01Q 1/1271; H01Q 1/27; H01Q 1/32; H01Q 1/3208; H01Q 1/3233; H01Q 1/325; H01Q 13/20; H01Q 13/206; H01Q 17/00; H01Q 21/06; H01Q 21/061; H01Q 21/065; H01Q 25/002; H01Q 1/52; H01Q 1/526; G01S 7/02; G01S 7/28; G01S 7/2813; G01S 13/02; G01S 13/06; G01S 13/42; G01S 13/424; G01S 13/88; G01S 13/93; G01S 13/931; G01S 2013/9371; G01S 2013/9375; G01S 2013/9392

USPC ......... 342/13, 20, 27, 28, 70–72, 82, 89, 175, 342/1–4; 340/425.5, 426.1; 343/700 R, 343/711–713, 700 MS
See application file for complete search history.

(56) References Cited

U.S. PATENT DOCUMENTS 5,438,333 A * 8/1995 Perkins et al. .................... 342/4
5,620,799 A    4/1997 Sauer
(Continued)

FOREIGN PATENT DOCUMENTS

DE    195 36 000 A1    4/1997
EP    1 183 913 A1    3/2002
(Continued)

OTHER PUBLICATIONS

European Search Report dated Mar. 30, 2015.

*Primary Examiner* — Bernarr Gregory
(74) *Attorney, Agent, or Firm* — Lawrence D. Hazelton

(57) ABSTRACT

A ground vehicle radar system includes a windshield of the ground vehicle and a radar device installed behind the windshield. The windshield includes a metallization layer configured to inhibit propagation of infrared radiation through the windshield that also inhibits the propagation of radar signals. The metallization layer defines an opening in the metallization layer for radar signals emitted and detected by a radar device to pass through. An antenna of the radar device is installed behind the windshield and aligned with the opening. A lower portion of the antenna has a first field of view through the opening characterized as being directed horizontal toward a horizon forward of the vehicle. An upper portion of the antenna has a second field of view through the opening characterized as being directed downward toward an area of the ground forward of the vehicle.

10 Claims, 2 Drawing Sheets

(51) Int. Cl.
   *H01Q 17/00* (2006.01)
   *G01S 13/42* (2006.01)
   *G01S 13/93* (2006.01)
   *H01Q 1/12* (2006.01)
   *H01Q 1/32* (2006.01)
   *H01Q 13/20* (2006.01)
   *H01Q 21/06* (2006.01)
   *H01Q 25/00* (2006.01)
   *H01Q 1/52* (2006.01)
   *G01S 7/00* (2006.01)
   *G01S 13/00* (2006.01)
   *G01S 7/28* (2006.01)

(52) U.S. Cl.
   CPC ............ *H01Q21/065* (2013.01); *H01Q 25/002* (2013.01); *G01S 7/2813* (2013.01); *G01S 2013/9375* (2013.01); *G01S 2013/9392* (2013.01)

(56) References Cited

U.S. PATENT DOCUMENTS

| | | | |
|---|---|---|---|
| 5,867,129 A * | 2/1999 | Sauer | 343/713 |
| 6,211,831 B1 * | 4/2001 | Nagy et al. | 343/713 |
| 6,356,236 B1 * | 3/2002 | Maeuser et al. | 343/713 |
| 6,515,582 B1 * | 2/2003 | Teowee et al. | 340/426.1 |
| 6,891,517 B2 * | 5/2005 | Voeltzel | 343/713 |
| 7,864,099 B2 | 1/2011 | Colburn et al. | |
| 2005/0116854 A1 | 6/2005 | Beez et al. | |
| 2007/0164916 A1 * | 7/2007 | Zafar et al. | 343/713 |
| 2011/0163904 A1 | 7/2011 | Alland et al. | |
| 2013/0015999 A1 | 1/2013 | Alland | |

FOREIGN PATENT DOCUMENTS

| | | |
|---|---|---|
| EP | 2 546 676 A1 | 1/2013 |
| GB | 2 482 513 A | 2/2012 |
| WO | 00/72634 A1 | 11/2000 |

* cited by examiner

RADAR DEVICE FOR BEHIND WINDSHIELD INSTALLATIONS

TECHNICAL FIELD OF INVENTION

This disclosure generally relates to a radar device installed behind a windshield, and more particularly relates to a radar antenna configuration that allows for the size of an opening in a metallization layer of the windshield to be reduced.

BACKGROUND OF INVENTION

An integrated radar and camera module (RACam) described in United States Patent Application Publication 2011/0163904 entitled INTEGRATED RADAR-CAMERA SENSOR by Alland et al. was published Jul. 7, 2011. When a radar device is installed behind a windshield of a vehicle as shown, it is preferable that the windshield does not undesirably obstruct, attenuate, or otherwise interfere with radar signals propagating through the windshield. However, many windshields are equipped with a metallization layer to reduce the amount of infrared radiation passing through the windshield in order to reduce the amount of vehicle interior heating by the sun. If such a metallization layer is present in the radar device's field of view, radar signals propagating through the windshield may be undesirable attenuated.

SUMMARY OF THE INVENTION

In accordance with one embodiment, a ground vehicle radar system is provided. The system includes a windshield of a vehicle and a radar device. The windshield includes a metallization layer configured to inhibit propagation of infrared radiation through the windshield. The metallization layer also inhibits propagation of radar signals. The metallization layer defines an opening in the metallization layer for signals emitted and detected by a radar device to pass therethrough. The antenna is configured to be installed behind the windshield and aligned with the opening such that a lower portion of the antenna has a first field of view through the opening characterized as being directed horizontal toward a horizon forward of the vehicle, and an upper portion of the antenna has a second field of view through the opening characterized as being directed downward toward an area of the ground forward of the vehicle.

In another embodiment, a ground vehicle radar device configured to be installed behind a windshield of the vehicle is provided. The windshield includes a metallization layer configured to inhibit propagation of infrared radiation through the windshield, wherein the metallization layer also inhibits propagation of radar signals. The metallization layer defines an opening in the metallization layer for signals emitted and detected by the radar device to pass therethrough. The radar device includes an antenna. The antenna is configured to be installed behind the windshield and aligned with the opening such that a lower portion of the antenna has a first field of view through the opening characterized as being directed horizontal toward a horizon forward of the vehicle, and an upper portion of the antenna has a second field of view through the opening characterized as being directed downward toward an area of the ground forward of the vehicle.

In yet another embodiment, an antenna of a ground vehicle radar device configured to be installed behind a windshield of the vehicle is provided. The windshield includes a metallization layer configured to inhibit propagation of infrared radiation through the windshield, wherein the metallization layer also inhibits propagation of radar signals, wherein said metallization layer defines an opening in the metallization layer for signals emitted and detected by the radar device to pass therethrough. The antenna is configured to be installed behind the windshield and aligned with the opening. The antenna includes a lower portion and an upper portion. The lower portion has a first field of view through the opening characterized as being directed horizontal toward a horizon forward of the vehicle. The upper portion has a second field of view through the opening characterized as being directed downward toward an area of the ground forward of the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
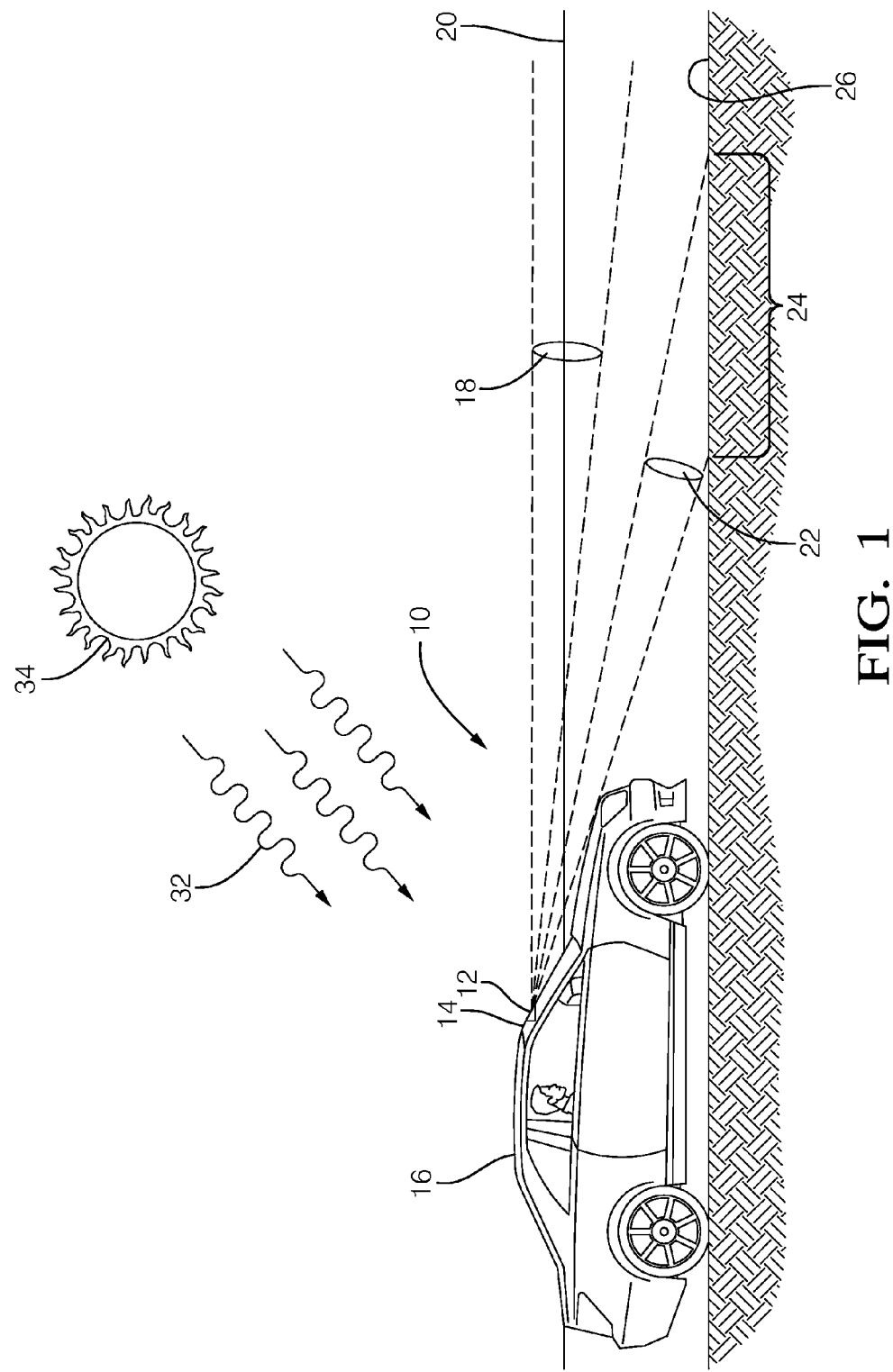
FIG. 1 is a side view of a vehicle equipped with a ground vehicle radar system in accordance with one embodiment.

FIG. 1 illustrates a non-limiting example of a ground vehicle radar system, hereafter the system 10. The system 10 includes a radar device 12 installed behind a windshield 14 of a vehicle 16. In this non-limiting example, the radar device 12 is configured to preferentially project and/or detect radar signals toward/from a first field of view 18 generally characterized as being directed horizontal toward a horizon 20 forward of the vehicle 16, and a second field of view 22 generally characterized as being directed downward toward an area 24 of the roadway or ground 26 forward of the vehicle 16. By way of example and not limitation, the system 10 may be particularly configured detect objects in the first field of view 18 such as other vehicles traveling a substantial distance in front of the vehicle 16 (e.g. more than two hundred meters (200 m)), and a vehicle in the second field of view that is substantially closer (e.g. less than five meters (5 m)).

Figure 2:
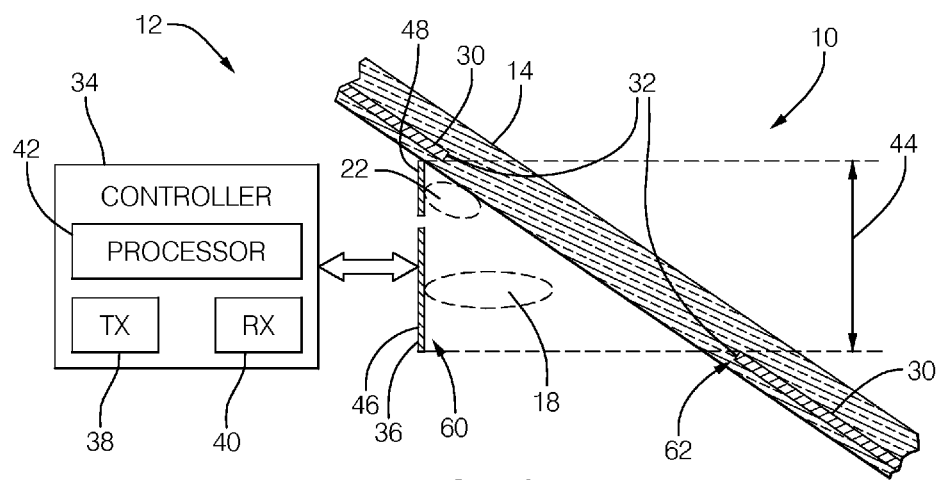
FIG. 2 is a sectional side view of the system of FIG. 1 in accordance with one embodiment.

FIG. 2 further illustrates a non-limiting example of the system 10. The radar device 12 generally includes a controller 34 and an antenna 36. The controller 34 may include a transmitter 38 configured to output radar signals to the antenna 36 and a receiver 40 configured to detect radar signals impinging on the antenna 36. The controller 34 may include a processor 42 such as a microprocessor or other control circuitry as should be evident to those in the art. The processor 42 may include memory, including non-volatile memory, such as electrically erasable programmable read-only memory (EEPROM) for storing one or more routines, thresholds and captured data. The one or more routines may be executed by the processor 42 to perform steps for determining if a signal received by the receiver 40 indicates the presence of an object at a certain distance, thirty meters (30 m) for example.

Continuing to refer to FIG. 2, further description of the windshield 14 is now provided. In general, the windshield 14 includes a metallization layer 30 configured to inhibit propagation of infrared radiation 32 (FIG. 1) from the sun 29 through the windshield 14. By way of example and not limitation, the metallization layer 30 may be a few Angstroms (Å)

thick layer of a metal oxide such as an oxide of tin, zinc, and/or indium. Such metallization layers are known in the windshield manufacturing arts, and are applied using methods known by those skilled in the art. The metallization layer 30 may be between various layers of the windshield 14 as illustrated, or the metallization layer may be on either an inner or outer surface of the windshield 14. Unfortunately, the metallization layer 30 typically inhibits propagation of radar signals to and from the radar device 12. As such, the metallization layer preferably defines an opening 32 in the metallization layer 30 so radar signal emitted and detected by the radar device 12 can more readily pass through the windshield 14.

Vehicle manufacturers prefer that the opening 32 be as small as possible so as much of the infrared radiation 28 as possible can be blocked from entering the interior or passenger compartment of the vehicle 16, and so the opening 32 does not detract from the appearance of the vehicle 16. Prior configurations of antennas for a radar device behind a windshield such the integrated radar and camera module (RACam) described in United States Patent Application Publication 2011/0163904 entitled INTEGRATED RADAR-CAMERA SENSOR, and published Jul. 7, 2011 by Alland et al. were such that any point on the antenna contributed to the radar signal pattern shaping. As such, the expectation was that any point on the antenna should have a clear path through the windshield 14 to the various fields of view. If the metallization layer 30 obstructed the path because the opening 32 was too small, the radar signal pattern shape would be distorted. As a result, the opening 32 in the metallization layer 30 was larger than desired because the opening 32 was considered an undesirable cosmetic feature. As will be explained in more detail below, the features of the antenna 36 described herein allow for the size of the opening 32 to be reduced or minimized when compared to prior antenna configurations, while maintaining the desired radar signal pattern shape.

In order to minimize the size 44 or the opening 32, the antenna 36 of the radar device 12 includes a lower portion 46 of the antenna 36 aligned with the opening 32 such that a vantage point or phase center of the lower portion 46 aligns with the first field of view 18 in a manner effective to have a clear path through the opening 32. As described above, the first field of view 18 is characterized as being directed horizontally forward of the vehicle 16. In order to detect objects in the second field of view 22, the antenna 36 also includes an upper portion 48 of the antenna 36 aligned with the opening 32 such that a vantage point or phase center of the upper portion 48 aligns with the second field of view 22 through the opening 32. As described above, the second field of view 22 is characterized as being directed downward toward the area 24 of the ground 26 forward of the vehicle.

Figure 3:
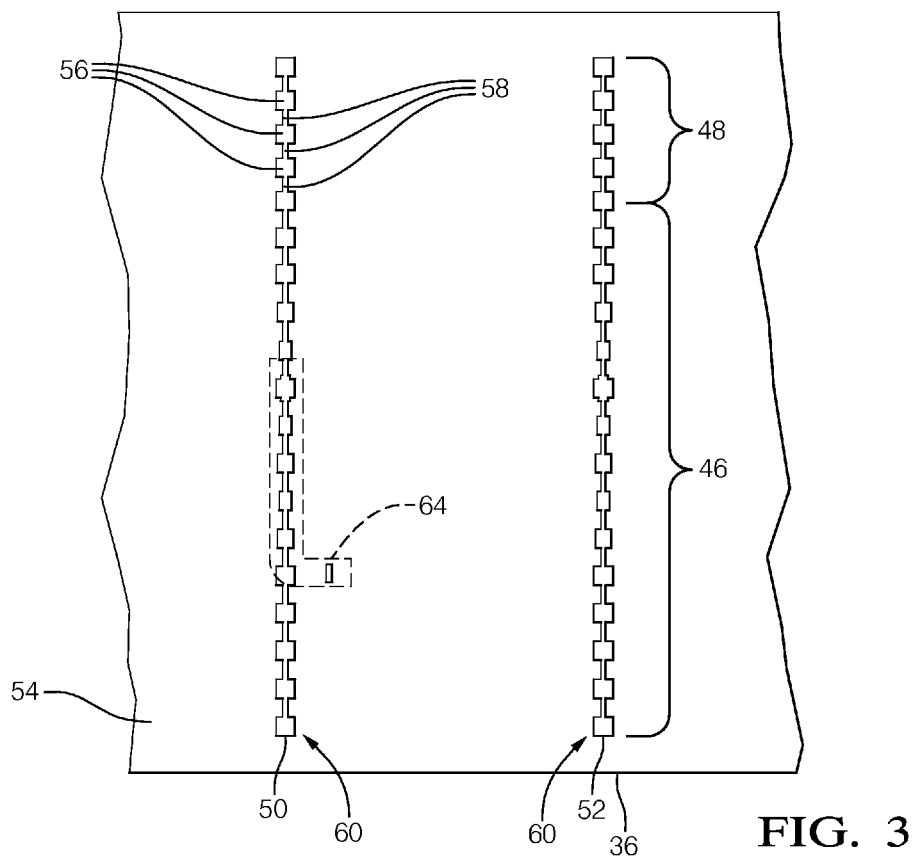
FIG. 3 is front view of an antenna of the system of FIG. 1 in accordance with one embodiment.

FIG. 3 further illustrates a non-limiting example of the antenna 36. FIG. 3 is a front view of the antenna 36, while FIG. 2 shows a side or edge view of the antenna 36. The antenna may include one or more elements, for example a first element 50 and a second element 52. The elements 50, 52 may be formed to overlay a substrate 54 using known photolithography processes commonly used for manufacturing printed circuit boards. The elements 50, 52 generally include a plurality of radiator patches 56 interconnected by microstrips 58. The size of the patches 56 and the spacing between each of the patches 56 (i.e. the patch pitch) determines what radar signal pattern shape any portion of the first element 50 or the second element 52 will have.

In this non-limiting example, the substrate 54 is orientated substantially normal to the first field of view 18, for example within five degrees (5°) of angle of normal, i.e.—perpendicular. In other words, in this example, the substrate is within 5° of vertical. The lower portion 46 is preferably configured to detect preferentially a signal from the first field of view 18, i.e. in a horizontal direction. By way of example and not limitation, for a radar frequency of 76.5*10^9 Hertz (76.5 GHz), the elements 50, 52 may be formed of half-ounce copper foil on a 380 micrometer (µm) thick substrate such as RO5880 substrate from Rogers Corporation of Rogers, Conn. The patches 56 in the lower portion 46 preferably have a width of 1394 µm and a height of 1284 µm. The patch pitch of the lower portion 46 is preferably one guided wavelength, e.g. 2560 µm, and the microstrips 58 interconnecting each of the patches 56 are preferably 503 µm wide. Such a configuration will provide a lower portion 46 that has a radar signal pattern shape or lobe that is normal to the antenna 36 as shown in FIG. 2, and aligned with the first field of view 18.

In general, the lower portion 46 provides a narrow bore sight type beam pattern or lobe which only requires an opening having roughly the size of the lower portion 46. As such, for this example, a bottom end 60 of the antenna 36 or the elements 50, 52 is aligned horizontally with a lower edge 62 of the opening 32. In prior examples of antennas for RACam, the lower edge 62 would need to be lower because the bottom ends of the earlier antenna configuration would need to be able to 'look over' the lower edge 62 to 'see' objects below the horizon 20. However, as will become clear with the description of the upper portion 48 that follows, now the lower edge 62 of the opening 32 can be aligned horizontally with the bottom end 60.

The upper portion 48 is preferably configured to detect preferentially a signal from the second field of view 22, which is distinct from the first field of view 18. In general, when the radar device 12 transmits, the upper portion 48 may generate a down looking beam that focuses much of the energy from the upper portion 48 in a downward direction. Because of the higher position or vantage point, the upper portion 48 is better able to look over the lower edge 62 of the opening 32. The advantage can be attributed to the offset-phase-center (OPC) nature of the upper portion 48. With respect to prior antenna configurations for the RACam, instead of moving the lower edge 62 down, thereby increasing the size 44 of the opening 32, a portion (the upper portion 48) of the antenna 36 is placed high on the substrate 54 so the vantage point is improved for looking down.

By way of example and not limitation, for the operating frequency and substrate described above, the patches 56 in the upper portion 48 preferably have a width of 1394 µm and a height of 1284 µm. The patch pitch of the upper portion 48 is preferably less than one guided wavelength to provide a non-perpendicular pattern, e.g. 2000 µm, and the microstrips 58 interconnecting each of the patches 56 are preferably 163 µm wide.

Continuing to refer to FIG. 3, in one embodiment the lower portion 46 and the upper portion 48 are both connected to an antenna input port 64, i.e.—the same antenna input port. By way of example and not limitation, the antenna input port 64 may be formed by a substrate-integrated-waveguide (SIW) formed on a second substrate layer (e.g. 500 µm thick RO5880) on the other side of the substrate 54 as the elements 50, 52, and connected by a coupling slot on a ground plane of the substrate 54, as will be recognized by those skilled in the art. Preferably, the coupling slot is aligned to the center of a patch in the lower portion 46, and the selected patch can be any one patch of the plurality of patches in the lower portion 46. While only a contact to the first element 50 is shown, it should be understood that the second element 52 may have a similar input port configuration. The contact to the second element 52 is not shown only to simplify the illustration. Such a configuration is advantageous as it simplifies the controller 34 since the upper portion 48 and the lower portion 46 do not need distinct independent transmitters and/or receivers. When both portions are fed, a total pattern is formed with a high gain pencil beam corresponding to the first field of view 18, and a side-lobe corresponding to the second field of view 22. Since, the lower portion 46 does not contribute significantly to the −15 deg beam corresponding to the second field of view 22, blockage of signals to and from the lower portion by the metallization layer 30 is not consequential. Compared with antennas designed using conventional methods, the off-set phase-center (OPC) antenna 36 described herein provides a higher peak gain, satisfies multiple field of view coverage, and allows the size 44 of the opening 32 to be reduced.

In the non-limiting example given, the lower portion 46 is longer (i.e. has more patches 56) and so the lower portion 46 may be characterized as having a first gain. In contrast, the upper portion 48 is shorter (i.e. has fewer patches 56) and so the upper portion may be characterized as having a second gain less than the first gain. It is recognized that the relative gains of the lower portion 46 and the upper portion 48 can be adjusted by changing the number of patches, or by adding additional elements to the elements 50, 52 shown. It is also recognized that each of the elements 50, 52 may include another portion (e.g. intermediate portion) for adding a lobe with a third field of view (not shown) to the antenna 36.

Accordingly, a ground vehicle radar system (the system 10), a radar device 12 for the system 10 and an antenna 36 for the radar device is provided. The antenna 36 defines distinct upper and lower portions of the antenna 36 with different fields of view or different lobe directions can be provided with different vantage points or phase-centers so that the size 44 of the opening 32 in the metallization layer 30 of the windshield 14 can be realized.

While this invention has been described in terms of the preferred embodiments thereof, it is not intended to be so limited, but rather only to the extent set forth in the claims that follow.

We claim:

1. A ground vehicle radar system, said system comprising:
a windshield of a vehicle, wherein said windshield includes a metallization layer configured to inhibit propagation of infrared radiation through the windshield, wherein the metallization layer also inhibits propagation of radar signals, wherein said metallization layer defines an opening in the metallization layer for signals emitted and detected by a radar device to pass therethrough;
an antenna of the radar device, said antenna configured to be installed behind the windshield and aligned with the opening such that a lower portion of the antenna has a first field of view through the opening characterized as being directed horizontal toward a horizon forward of the vehicle, and an upper portion of the antenna has a second field of view through the opening characterized as being directed downward toward an area of the ground forward of the vehicle.

2. The system in accordance with claim 1, wherein the lower portion and the upper portion are connected to the same antenna input port.

3. The system in accordance with claim 1, wherein the antenna overlays a substrate orientated substantially normal to the first field of view, wherein the lower portion is configured to detect preferentially a signal from the first field of view, and the upper portion is configured to detect preferentially a signal from the second field of view distinct from the first field of view.

4. The system in accordance with claim 1, wherein the lower portion is characterized as having a first gain, and the upper portion is characterized as having a second gain less than the first gain.

5. The system in accordance with claim 1, wherein the lower portion defines a bottom end of the antenna, and a lower edge of the opening is aligned horizontally with the bottom end.

6. A ground vehicle radar device configured to be installed behind a windshield of the vehicle, wherein said windshield includes a metallization layer configured to inhibit propagation of infrared radiation through the windshield, wherein the metallization layer also inhibits propagation of radar signals, wherein said metallization layer defines an opening in the metallization layer for signals emitted and detected by the radar device to pass therethrough, said device comprising:
an antenna of the radar device, said antenna configured to be installed behind the windshield and aligned with the opening such that a lower portion of the antenna has a first field of view through the opening characterized as being directed horizontal toward a horizon forward of the vehicle, and an upper portion of the antenna has a second field of view through the opening characterized as being directed downward toward an area of the ground forward of the vehicle.

7. The device in accordance with claim 6, wherein the lower portion and the upper portion are connected to the same antenna input port.

8. The device in accordance with claim 6, wherein the antenna overlays a substrate orientated substantially normal to the first field of view, wherein the lower portion is configured to detect preferentially a signal from the first field of view, and the upper portion is configured to detect preferentially a signal from the second field of view distinct from the first field of view.

9. The device in accordance with claim 6, wherein the lower portion is characterized as having a first gain, and the upper portion is characterized as having a second gain less than the first gain.

10. An antenna of a ground vehicle radar device configured to be installed behind a windshield of the vehicle, wherein said windshield includes a metallization layer configured to inhibit propagation of infrared radiation through the windshield, wherein the metallization layer also inhibits propagation of radar signals, wherein said metallization layer defines an opening in the metallization layer for signals emitted and detected by the radar device to pass therethrough, said antenna configured to be installed behind the windshield and aligned with the opening, said antenna comprising:
a lower portion that has a first field of view through the opening characterized as being directed horizontal toward a horizon forward of the vehicle; and
an upper portion that has a second field of view through the opening characterized as being directed downward toward an area of the ground forward of the vehicle.

* * * * *